Figure 4:
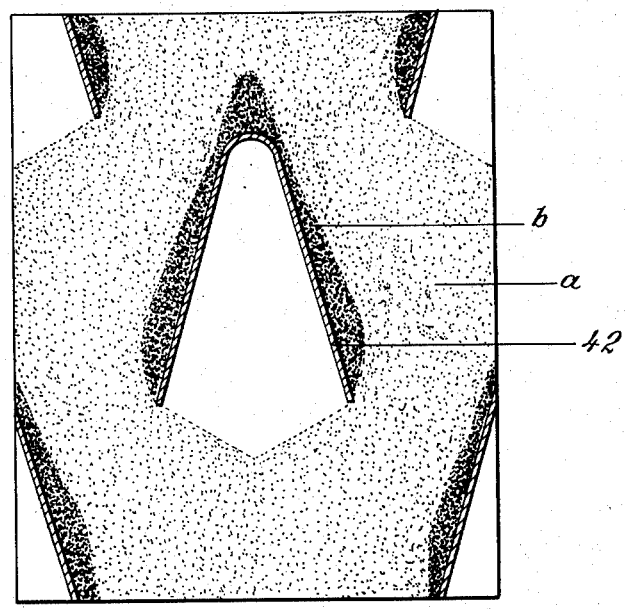

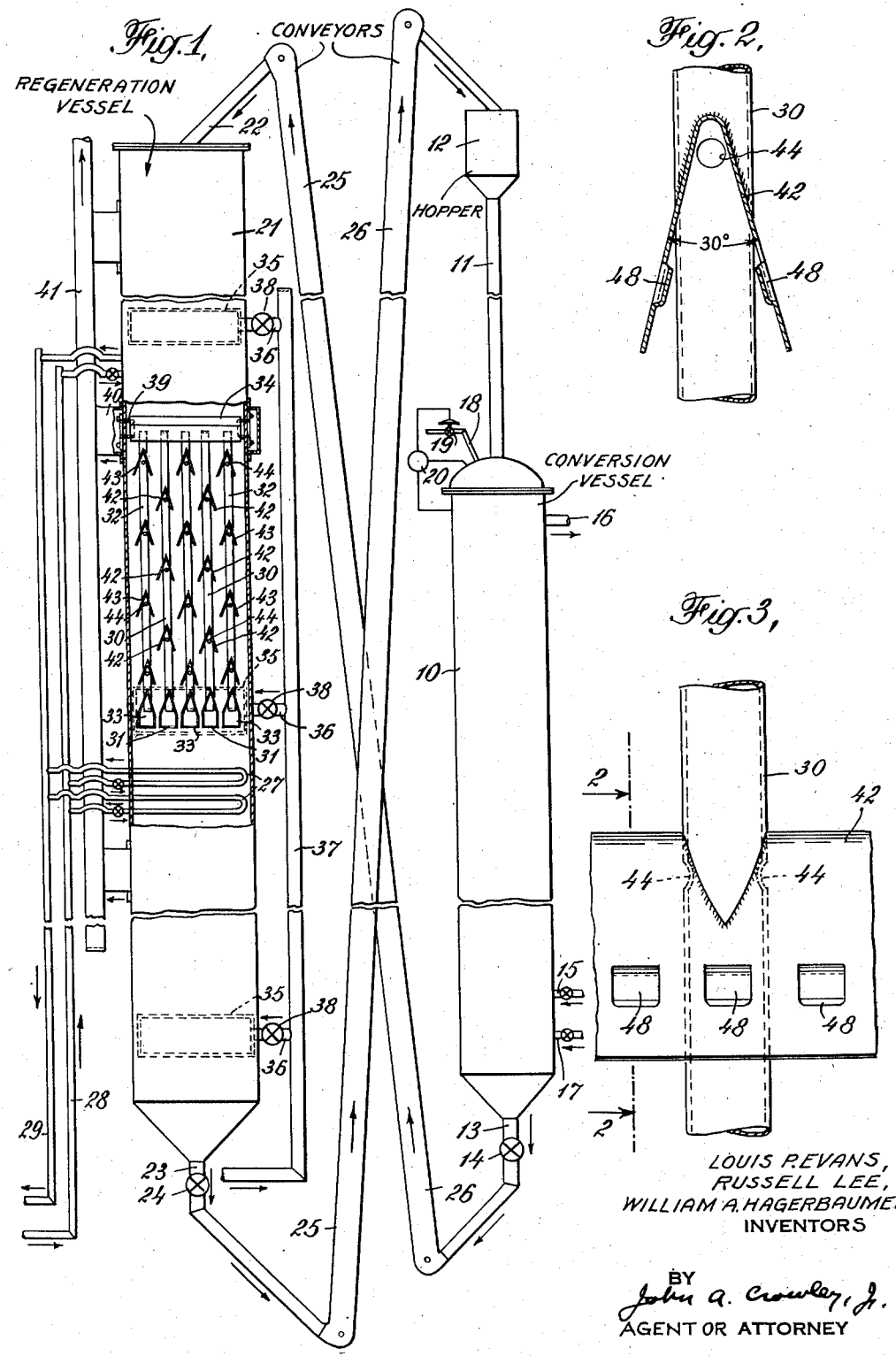

Patented Aug. 28, 1951

2,566,285

UNITED STATES PATENT OFFICE 2,566,285

METHOD FOR REGENERATION OF MOVING CATALYSTS

Louis P. Evans, Woodbury, Russell Lee, Wenonah, and William A. Hagerbaumer, Westfield, N. J., assignors to Socony-Vacuum Oil Company, Incorporated, a corporation of New York Application January 2, 1947, Serial No. 719,758

5 Claims. (Cl. 252—418)

This application is a continuation in part of application Serial Number 459,490, filed in the United States Patent Office on September 24, 1942, now abandoned.

This invention relates to a method and apparatus for the catalytic conversion of hydrocarbons and the like in the presence of a contact mass. It has particularly to do with a process wherein contact material in particle form is passed cyclically through a conversion zone wherein it is contacted under conversion conditions with fluid hydrocarbons to effect their conversion and through a regeneration zone wherein it passes as a substantially compact column of downwardly moving particles while being subjected to contact with a combustion supporting gas acting to burn off of the contact material carbonaceous contaminants deposited thereon during the hydrocarbon conversion.

Typical of conversion processes to which this invention relates are the catalytic cracking of petroleum gas oils and the like to lower boiling gasoline containing products. Other typical processes are the catalytic hydrogenation, dehydrogenation, reforming, polymerization, polyforming, alkylation, isomerization, aromatization, treating and desulphurizing of hydrocarbon fractions. Since this invention deals with processes wherein the catalyst moves as a compact mass, it involves the use of catalyst in particle form, the particles ranging from about 3 to 100 mesh and preferably from about 4 to 20 mesh in size as measured by Standard Tyler Screen Analysis. Typical of the catalysts are materials which may partake of the nature of natural or treated clays, bauxites or certain synthetic associations of silica, alumina or silica and alumina to which other constituents such as certain metallic oxides may be added in small amounts for special purposes.

In cyclic conversion processes of this type it is of considerable importance to maintain the catalytic effectiveness of the cyclically moving catalyst at a high level. The catalyst becomes spent during its passage through the hydrocarbon conversion zone due to deposition of carbonaceous contaminants thereon. It is customary to remove such contaminants by burning in a separate regeneration zone. It is very important to maintain the catalyst temperature during its regeneration at a level which will promote burning at practical rates. On the other hand, heat is released by the combustion of the contaminants in amounts sufficient to heat the catalyst to temperatures which would cause permanent heat damage to its catalytic effectiveness for the hydrocarbon conversion. Moreover, as the burning proceeds the contaminant composition changes, requiring higher and higher temperatures for practical burning rates, so that in the later stages of the regeneration the spread between the temperature level required for practical burning rates and the temperature level which will cause permanent heat damage to the catalyst is relatively small. As a result it is of considerable importance in the regeneration operation to provide method and apparatus which will permit uniform and accurate control of the rates of catalyst and gas flow and of the catalyst temperature in all portions of the regenerator. An important factor in determining the above control is the type of means and the method employed for introduction of combustion supporting gas to the catalyst column in the regenerator and for withdrawing regeneration gas therefrom.

A major object of this invention is the provision of an improved cyclic process for the conversion of hydrocarbons in the presence of a moving mass of contact material.

A specific object is the provision of an improved method for regeneration of particle-form contact materials which have become spent in use for hydrocarbon conversion.

Another specific object is the provision of an improved catalyst regeneration system provided with an improved method and apparatus for introducing gas into a column of moving catalyst in the regeneration zone and for withdrawing gas therefrom.

These and other objects will become apparent from the following discussion of the invention.

Figure 5:
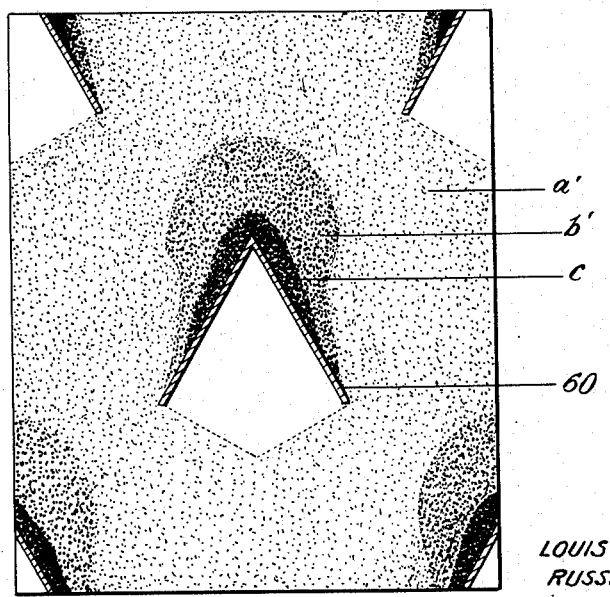

The invention may be more readily understood by reference to the drawings attached hereto of which Figure 1 is an elevational view, partially in section, showing the cyclic conversion apparatus of this invention; Figure 2 is an enlarged view showing details of an improved gas handling trough and tube such as is used in the apparatus of Figure 1; Figure 3 is another view of this trough and tube; Figure 4 is a sketch showing the solid flow pattern resulting from the use of the improved gas handling troughs and Figure 5 is a similar sketch showing the flow pattern resulting when the improved trough is not used. All of these drawings are highly diagrammatic in form.

Turning now to Figure 1, there is shown a conversion vessel 10 provided on its upper end with a catalyst gravity feed leg 11 supplying catalyst from a hopper 12, and on its lower end with a catalyst drain conduit 13 bearing a flow control valve 14. Hydrocarbons heated to a suitable conversion temperature, for example 850° F., may be introduced to the lower section of vessel 10 through conduit 15. Fluid reactant products may be withdrawn from the upper section of the reactor through outlet 16. The reactant inlet and outlet may be interchanged where concurrent flow of hydrocarbons and catalyst is desired.

Purge gas such as steam or flue gas may be introduced to the lower section of the reactor 10 through conduit 17 and inert seal gas may be introduced to the upper end thereof through inlet 18. The rate of seal gas introduction may be controlled by diaphragm valve 19 controlled in turn by differential pressure controller 20. Also shown in Figure 1 is a regeneration vessel 21 having solid inlet conduit 22 at its upper end and on its lower end a catalyst outlet conduit 23 bearing flow control valve 24. Suitable conveyors 25 and 26 are provided for passage of catalyst between the conversion and regeneration vessels. The regenerator shown is of the multistage type being provided with a series of alternating burning and cooling stages. Cooling coils 27 are provided in the cooling stages. These coils may be supplied with a suitable cooling fluid such as steam, water, molten alloys or fused inorganic salts from manifold 28. The cooling fluid may be withdrawn from coils 27 through manifold 29. Within each burning stage there are provided a plurality of rows of spaced vertical distributor tubes 30, each row communicating at its lower end with a gas inlet trough 31. The upper ends of tubes 30 are closed. Also provided are a plurality of rows of spaced vertical collector tubes 32 each row connecting on its closed lower end into a dummy trough 33 and on its open upper end into an outlet trough 34. The troughs 33 are supported on opposite ends from the vessel shell but do not communicate with external gas handling manifolds. The outlet trough 34 also serves to partially support tubes 30. The inlet troughs 31 communicate with an external manifold indicated by dotted lines at 35 and each manifold 35 is supplied with gas from a duct 36 which in turn connects into supply manifold 37. A flow control valve 38 is provided on each duct 36. Each outlet trough communicates through a supporting sleeve 39 into a manifold duct 40 which in turn connects into outlet manifold 41. Attached perpendicularly to the distributor tubes 30 in each row thereof are a series of spaced, horizontally extending, inverted V-shaped troughs 42. Similar troughs 43 are attached to collector tubes 32, the arrangement being such that the collector troughs 43 are offset vertically from distributor troughs 42. Holes 44 in tubes 30 and 32 positioned at levels just under the apices of the troughs communicate the interior of the tubes with the respective troughs. It will be noted that the side walls of the troughs slope alike and at an angle with the horizontal equal to about 75 degrees.

In operation catalyst passes cyclically through conversion vessel 10 and regeneration vessel 21, moving in said vessels as a substantially compact mass. Heated fluid hydrocarbons are introduced into the conversion vessel at 15 and gaseous conversion products are removed at 16 and processed in a conventional fractionation system not shown. A seal gas such as steam may be introduced into the upper end of vessel 10 at 18 to prevent escape of hydrocarbons up the feed leg 11. A purge gas such as steam may be admitted at 17 to purge hydrocarbon reactants from the outflowing spent contact material. If desired the conversion vessel may be of multistage construction, being provided with riser tubes and gas distributor troughs and collector troughs as described in connection with the regeneration vessel. Spent contact material bearing carbonaceous contaminant deposits is conveyed by conveyor 25 to the upper end of the regeneration vessel. Combustion supporting gas such as air is introduced from manifold 37 into inlet troughs 31 in the regeneration vessel from which it passes through tubes 30 and holes 44 under the distributor troughs 42. The gas then passes out from under the troughs 42 into the column of contact material flowing past said troughs. The direction of gas flow through the column is substantially as indicated by flow arrows on the drawing. The gas is collected from the contact material column by troughs 43 and then passes through holes 44 into tubes 32 and thence to outlet troughs 34 from which it flows through sleeves 39 and ducts 40 to outlet manifold 41. The rate of gas flow in each burning stage may be independently controlled by means of valves 38 on ducts 36. The catalyst temperature is maintained in each stage at a level suitable for contaminant burning at practical rates and below a temperature which would cause permanent heat damage to the catalyst.

The required practical burning temperature will vary depending upon the particular contaminant involved and it will further gradually increase as the burning progresses. In regenerating clay-type catalysts which have become spent in the cracking conversion of hydrocarbon gas oils in the vapor phase at temperatures of the order of 800° F. and upwards, the catalyst temperature in the regenerator required for practical burning rates may vary from about 800° F. and upwards at the upper end of the regenerator to about 1000–1100° F. in the lower stages. The heat damaging temperature will vary with the nature of the catalyst being of the order of temperatures above about 1200° F. for clay catalysts and of the order of temperatures above about 1400° F. for many synthetic gel-type catalysts. The catalyst temperature range in any stage may be controlled by means of cooling between stages. While a multi-stage regenerator has been described hereinabove it should be understood that the invention is considered broad to either multi-stage or single stage regenerators.

Turning to Figures 2 and 3, there may be seen enlarged views of a portion of one of the distributor tubes 30 and a distributor trough 42. It will be seen that louvers 48 may be provided in the side walls of the troughs and that the trough side walls slope alike at an angle which is equal to about 75° with the horizontal. It has been found to be of considerable importance that the side walls of the distributing and collecting troughs slope with the horizontal at an angle at least equal to or greater than 75°.

The importance of this provision may be best understood by a study of Figures 4 and 5. In Figure 4 there is a detailed study of flow conditions in the column of catalyst in the regeneration zone in which are provided inverted V-shaped troughs having side walls which slope alike and at an angle of about 75° with the horizontal. The zone of solid flow indicated at "$a$" corresponds to a zone of normal solid flow wherein the linear velocity of the catalyst particles in the regeneration zone was within a normal range of flow velocities. The zone of solid flow indicated at "$b$" which is just adjacent the walls of the trough 42 is a low velocity zone wherein the rate of solid flow is below the normal range of velocities. It will be apparent that the volume of the low flow velocity zone "$b$" is very small when troughs having side walls which slope at an angle with the horizontal at least equal to 75° are employed. In a typical regeneration operation it was found that when the catalyst temperature in the normal flow zone "a" was about 910° F., the temperature in zone "b" was about 980° F.

Looking now at Figure 5, there is shown a similar arrangement except that the side walls of the trough 60 shown in Figure 5 slope alike at an angle with the horizontal equal to about 60 degrees. In Figure 5 "a'" represents the zone of normal solid flow and "b'" represents the low velocity flow zone. It will be noted that the zone of low velocity is much greater in the case of the trough having side walls sloping at 60 degrees than in the case of the trough having side walls sloping at 75 degrees. Moreover, in the case of the trough having side walls sloping at 60 degrees a zone "c" arises wherein the contact material is substantially stagnant. It was found that in a catalyst regeneration operation conducted under the same conditions as were used in the example above except that the trough walls sloped at 60 degrees with the horizontal instead of at 75 degrees, when the catalyst temperature in the normal zone of flow "a'" was about 942° F., the temperature in the zone "b'" of low velocity flow was about 1179° F.

From the above examples it will be apparent that for a typical catalyst regeneration the spread in catalyst temperatures at any level in the regenerator between the normal flow and low flow rate zones are about 237° F. and 70° F. for troughs having side walls sloping at 60 degrees and 75 degrees respectively. As pointed out hereinabove, due to the gradual change in contaminant composition during the catalyst regeneration, the temperature required to promote practical combustion rates and efficient contaminant removal gradually increases as the catalyst passes through the regenerator. In the regeneration of catalysts which have become spent in the catalytic cracking conversion of hydrocarbons it has been found that often catalyst temperatures in the normal zone of flow (see "a" Figure 4) of the order of 1000° F. to 1100° F. are required during certain stages of the regeneration in order to insure practical burning rates and substantially complete removal of contaminant from the catalyst. If an attempt is made to regenerate a clay catalyst which would be heat damaged if heated above about 1200° F., in a regenerator provided with troughs having side walls sloping with the horizontal at about 60° F., it will be clear from the above examples that the maximum allowable temperature in the normal zone of catalyst flow will be about 1199−237=962° F. In other words in such an operation, the catalyst temperature in the normal zone of flow could never be permitted to rise to the 1000–1100° F. temperature required for complete regeneration and practical burning rates in many operations, without permitting the catalyst to be overheated to a heat damaging level in the zone of lower than normal flow. On the other hand if the same catalyst is regenerated in a regenerator provided with troughs having side walls sloping at 75 degrees, then the temperature in the normal zone of flow may rise to the required 1000–1100° F. range without the overheating of the catalyst to a heat damaging level at any location in the regenerator. It will be apparent from the above that this critical advantage which permits the complete regeneration of many catalysts at practical burning rates without danger of overheating the catalyst is characteristic only of gas handling troughs having side walls which slope alike at an angle with the horizontal at least equal to about 75° F. and preferably at a greater angle.

It will be noted that the trough construction shown in Figure 2 involves the rounding of the apex of the trough. It has been found that if the sides are properly sloped as disclosed hereinabove, the rounding of the apex did not give rise to an appreciable collection of "dead" contact mass at that point. The space under each trough above the orifice in the distributing or collecting tubes is waste space, and in reactors or regenerators with many troughs the total waste space so accumulated is appreciable. So, it is preferable to use the round apex, which not only minimizes this waste space but gives a stronger and more easily fabricated trough. It should be understood that in claiming this invention the expression "inverted V-shaped trough" is intended to broadly mean troughs having rounded or sharp pointed apices.

It should be understood that the specific examples of operating conditions, apparatus construction and application of this invention given hereinabove are intended as illustrative and should not be construed as limiting the scope of this invention in any way except as it may be limited by the folowing claims.

We claim:

1. The process for regeneration of spent particle form adsorbent contact material bearing a carbonaceous contaminant deposit which comprises, passing said adsorbent downwardly through a confined regeneration zone as a substantially compact column of particles, baffling the flow of the adsorbent in said column to provide a plurality of spaced apart gas handling spaces in said column within said regeneration zone, introducing an oxygen containing gas into some of said gas spaces from a source outside of said zone and distributing the gas from said gas spaces into said column to contact said adsorbent and to effect burning of said carbonaceous contaminant; withdrawing regeneration gases formed during the burning from the remaining gas spaces in said column, maintaining the adsorbent in the normal zone of flow, which is substantially outside the sphere of influence of said baffling, at temperature levels which are below that which will cause heat damage to the adsorbent but sufficiently high to promote contaminant burning at practical combustion rates, and at the same time preventing the adsorbent flowing near said gas spaces from rising to a temperature more than about 70° F. in excess of those in the normal zone of flow and from rising to a heat damaging level by conducting said flow baffling in a manner which will limit the angle of divergence with the vertical of adsorbent flow above said gas spaces to not greater than about 15 degrees.

2. In a process for regeneration of spent particle-form contact materials bearing carbonaceous deposits, wherein said contact material is passed as a substantially compact column downwardly through a confined regeneration zone while being contacted with an oxygen containing gas to burn said contaminant the improvement which comprises: commencing along each of a plurality of spaced horizontal lines within said column diverging the contact material flow within said column outwardly a short distance in opposite directions along downwardly sloping paths and shortly below said horizontal lines converging the solid flow so as to provide a plurality of spaced gas handling spaces communicating with said column at least along surfaces on the paths of contact material flow convergence, supplying oxygen containing gas from an external source to some of said gas spaces, flowing said gas from said spaces into contact with the solid material, withdrawing gaseous combustion products from the remainder of said gas spaces and effecting efficient contaminant removal from the contact material at practical burning rates by controlling the temperature of the contact material flowing in those locations in said column not closely adjacent said gas spaces substantially below a contact material heat damaging level but at levels conducive of efficient contaminant burnnig at practical rates while maintaining the angle of contact material flow divergence in said downwardly sloping paths which lie immediately above said gas spaces greater than about 75 degrees with the horizontal.

3. A method for regenerating a contaminant bearing particle-form contact material which has become spent in use as a contact mass for hydrocarbon conversion which method comprises: passing said particle-form contact material downwardly through a confined regeneration zone as a substantially compact column, baffling the contact material flow in said column to establish in said column within said regeneration zone a plurality of spaced apart gas spaces extending substantially horizontally across said column, each of said gas spaces being in gas flow communication with said column at least along the bottom of the gas space and being shielded along the top of the gas space from solid flow, introducing combustion supporting gas from an external source into some of said gas spaces, passing the gas through portions of said column to contact the solid material and effect burning of the contaminant thereon whereby heat is released, withdrawing gaseous regeneration products from the remaining gas spaces, controlling said baffling of the contact material flow to divide the downward contact material flow immediately above each gas space along oppositely sloping paths forming angles with the horizontal of at least 75 degrees, whereby a minimum spread in temperature not in excess of about 70° F. is maintained at any level in the column between the contact material in said sloping paths and in the zones of normal flow around said gas spaces, and by positive removal of heat from said column, controlling the temperature of the contact material in said zones of normal flow high enough for rapid contaminant combustion but below temperatures which would cause substantial permanent heat damage to the contact material by an amount at least equal to said minimum spread, the temperature at which the contact material will suffer permanent heat damage depending upon its composition and being above about 1200° F. for clay type adsorbents and above about 1400° F. for synthetic gel type adsorbents.

4. The process for regeneration of spent particle form adsorbent contact material bearing a carbonaceous contaminant deposit which comprises: passing said contact material downwardly through a confined regeneration zone as a substantially compact column of particles, baffling the flow of solids within said column to provide a plurality of spaced apart gas handling spaces within the column in gas flow communication therewith, introducing oxygen containing gas into some of said gas handling spaces, passing it from said spaces into and through portions of said column to effect burning of the contaminant on said contact material, withdrawing gaseous regeneration products from the remainder of said gas handling spaces and controlling the temperature of the contact material flowing through said regeneration zone so that the minimum temperature at any location across said column at at least one level is above about 1000° F. but substantially below a heat damaging level, the heat damaging level being above about 1200° F. for clay adsorbents and above about 1400° F. for synthetic gel type adsorbents, while at the same time limiting the spread between maximum and minimum contact material temperatures at locations across said column at any vertical level below that which would cause the contact material to reach a heat damaging level at any location by controlling the baffling to effect a divergence of the solid flow immediately above each gas space along downwardly sloping paths forming an angle with the horizontal of at least 75 degrees.

5. A method for regenerating a contaminant bearing particle form solid contact material which comprises: supplying said contact material into the upper section of a confined regeneration zone and passing it downwardly therethrough as a substantially compact column of gravitating particles, dividing the solid flow in said column along each of a plurality of spaced horizontal lines into two downwardly sloping diverging streams and shortly below each of said horizontal lines recombining said streams to provide within said column a plurality of spaced apart horizontally extending gas spaces from which gravity flow of solids is excluded but which are in gas flow communication with said column and to provide zones of normal solid flow in said column between said spaced gas spaces, introducing combustion supporting gas from an external source into some of said gas spaces and withdrawing regeneration gas from the remainder so as to promote gas flow through the column between said gas spaces with resultant heat liberating burning of the contaminant on said solid material, restricting to a practical minimum the spread in temperature between said downwardly sloping diverging streams and said zones of normal solid flow by maintaining the angle of divergence with the vertical of said sloping streams not greater than about 15 degrees, controlling the temperature of the contact material in the zones of normal solid flow at levels conducive to practical contaminant combustion rates and within the range about 1000° F. to 1100° F. at at least one vertical level in said column but below a heat damaging level by an amount at least equal to said minimum spread at any given level in the column and withdrawing regenerated contact material from the lower section of said column.

LOUIS P. EVANS.
RUSSELL LEE.
WILLIAM A. HAGERBAUMER.

REFERENCES CITED

The following references are of record in the file of this patent:

UNITED STATES PATENTS

| Number | Name | Date |
| --- | --- | --- |
| 1,950,263 | Pellegrino et al. | Mar. 6, 1934 |
| 2,410,309 | Simpson et al. | Oct. 29, 1946 |
| 2,417,399 | Simpson et al. | Mar. 11, 1947 |
| 2,436,780 | Simpson | Feb. 24, 1948 |